United States Patent
Xu et al.

(10) Patent No.: US 9,929,944 B2
(45) Date of Patent: Mar. 27, 2018

(54) REDUNDANCY DEVICE UNIT AND METHOD FOR DETERMINING FAULT IN INDUSTRIAL CONTROL SYSTEM, INDUSTRIAL CONTROL SYSTEM AND INDUSTRIAL SYSTEM COMPRISING REDUNDANCY DEVICE UNIT

(71) Applicant: ABB Schweiz AG, Baden (CH)

(72) Inventors: Ye Xu, Hangzhou (CN); Axel Lohbeck, Hangzhou (CN); Dieter Henkel, Hangzhou (CN)

(73) Assignee: ABB Schweiz AG, Baden (CH)

( * ) Notice: Subject to any disclaimer, the term of this patent is extended or adjusted under 35 U.S.C. 154(b) by 238 days.

(21) Appl. No.: 14/437,858

(22) PCT Filed: Nov. 7, 2012

(86) PCT No.: PCT/CN2012/084232
§ 371 (c)(1),
(2) Date: Apr. 23, 2015

(87) PCT Pub. No.: WO2014/071575
PCT Pub. Date: May 15, 2014

(65) Prior Publication Data
US 2015/0295817 A1 Oct. 15, 2015

(51) Int. Cl.
*G06F 15/173* (2006.01)
*H04L 12/703* (2013.01)
(Continued)

(52) U.S. Cl.
CPC .......... *H04L 45/28* (2013.01); *G05B 19/0423* (2013.01); *G05B 19/4184* (2013.01);
(Continued)

(58) Field of Classification Search
CPC .......... G05B 2219/33315; G05B 2219/34449; G05B 2219/34477; G06F 11/2007;
(Continued)

(56) References Cited

U.S. PATENT DOCUMENTS 5,640,140 A * 6/1997 Oka .................... H04B 1/74
340/3.7
6,178,327 B1 * 1/2001 Gomez ................ H04W 24/00
370/216
(Continued)

FOREIGN PATENT DOCUMENTS

| CN | 101241359 A | 8/2008 |
| CN | 101286954 A | 10/2008 |

(Continued)

OTHER PUBLICATIONS

ISA/CN International Search Report issued Aug. 1, 2013 re PCT Application No. PCT/CN2012/084232, filed Nov. 7, 2012.
(Continued)

*Primary Examiner* — Mohamed Wasel
(74) *Attorney, Agent, or Firm* — Taft, Stettinius & Holliser LLP

(57) ABSTRACT

A redundant device unit includes a first device connected with a field device via a first link and a second link in series. The first device, initially active in use, when active sends diagnostic information indicating whether there is a fault in the first link and/or the second link. A second device connected with the field device via the second link and a third link in series, initially passive in use, receives the first diagnostic information from the first device. When the first diagnostic information indicates that there is a fault in the first link and/or the second link, the first device switches to passive and the second device switches to active and generates second diagnostic information indicating whether there is a fault in the second link and/or the third link. A
(Continued)

determination regarding the fault is made based on the first and second diagnostic information.

20 Claims, 2 Drawing Sheets

(51) Int. Cl.

| | |
|---|---|
| *G06F 11/07* | (2006.01) |
| *G06F 11/20* | (2006.01) |
| *G05B 19/042* | (2006.01) |
| *G05B 23/02* | (2006.01) |
| *G05B 19/418* | (2006.01) |
| *G06F 11/22* | (2006.01) |
| *H04L 12/64* | (2006.01) |

(52) U.S. Cl.
CPC ........ *G05B 23/0237* (2013.01); *G06F 11/079* (2013.01); *G06F 11/0736* (2013.01); *G06F 11/2007* (2013.01); *G06F 11/221* (2013.01); *H04L 12/6418* (2013.01); *G05B 2219/33315* (2013.01); *G05B 2219/34449* (2013.01); *G05B 2219/34477* (2013.01); *G06F 11/2017* (2013.01)

(58) Field of Classification Search
CPC .... G06F 11/221; H04L 12/6418; H04L 45/28; H04L 12/40202
See application file for complete search history.

(56) References Cited

U.S. PATENT DOCUMENTS

| | | | |
|---|---|---|---|
| 6,446,201 | B1 | 9/2002 | Günther |
| 6,757,777 | B1 | 6/2004 | Griessbach et al. |
| 8,775,124 | B2* | 7/2014 | Fijany ..................... G06F 17/10 702/182 |
| 2002/0083364 | A1 | 6/2002 | Christensen et al. |
| 2003/0112746 | A1* | 6/2003 | Schaller .............. H04L 41/0609 370/216 |
| 2004/0260481 | A1 | 12/2004 | Heiligensetzer et al. |
| 2008/0123522 | A1* | 5/2008 | Elliott ............... H04L 12/40202 370/220 |
| 2010/0325719 | A1* | 12/2010 | Etchegoyen ........ H04L 63/0272 726/15 |
| 2014/0244192 | A1* | 8/2014 | Craig .................... G01R 21/06 702/62 |

FOREIGN PATENT DOCUMENTS

| | | |
|---|---|---|
| CN | 101840233 A | 9/2010 |
| EP | 1882996 A2 | 1/2008 |
| EP | 1882996 A3 | 7/2012 |

OTHER PUBLICATIONS

Supplementary European Search report issued Jun. 8, 2016 re Application No. EP 12887990 of ABB Technology Ltd.
Extended European Search Report, European Patent Application No. 12887990.5, dated May 27, 2016, 7 pages.

* cited by examiner

REDUNDANCY DEVICE UNIT AND METHOD FOR DETERMINING FAULT IN INDUSTRIAL CONTROL SYSTEM, INDUSTRIAL CONTROL SYSTEM AND INDUSTRIAL SYSTEM COMPRISING REDUNDANCY DEVICE UNIT

FIELD OF THE INVENTION

The present disclosure relates to the field of automatic control, and in particular to a redundancy device unit and method for determining a fault in an industrial control system, and an industrial control system and an industrial system comprising such redundancy device unit.

BACKGROUND OF THE INVENTION

Industrial control systems are now used in almost every industrial area, such as oil & gas, chemical, pharmaceutical, paper, mining and metal. In order to improve reliability of the industrial control system, a redundant device is used for devices of the industrial control system, such as input/output modules (I/O modules), so that the fault of one or more of the devices in the industrial control system will not affect the operation of the whole industrial control system. Normally, when there is a fault, the active device of the industrial control system (i.e. the device which is performing the data transmitting with its corresponding field device), can detect whether it is a fault about the links connected between the active device of the industrial control system and its field device or it is a fault occurred in the active device itself. Generally, if a fault in the link, e.g. link break and short circuit, is detected, the detected fault is usually considered as a fault in the immediate link connected with the field device which is usually shared by the active device and its redundant device, thus current industrial control systems do not execute switchover between the active device and its redundant device under such situation, since the fault of the link shared by the active device and its redundant device will cause endless switchover.

However, the detected faults in the link connected between the active device of the industrial control system and the field device comprise not only the faults in the link shared by the active device and its redundant device, but also the faults of the link not shared by the active device and its redundant device. The prior art does not give a thought on this and thus the efficiency of fixing the fault is lowered.

Therefore, there is a need to provide a technology to overcome the above disadvantages.

SUMMARY OF THE INVENTION

In order to address the foregoing technical problem, there is provided, according to an aspect of the invention, a redundant device unit for determining a fault of an industrial control system, comprises: a first device configured to be connected with a field device via a first link and a second link in series, the first device being configured to be initially active in use and send first diagnostic information indicating, when the first device is active, whether there is a fault in the first link and/or the second link; and a second device configured to be connected with the field device via the second link and a third link in series, the second device being configured to be initially passive in use and receive the first diagnostic information from the first device; wherein, when the first diagnostic information indicates that there is a fault in the first link and/or the second link, the first device is switched into passive and the second device is switched into active and generates a second diagnostic information indicating, when the second device is active, whether there is a fault in the second link and/or the third link, and a determination regarding the fault of the industrial control system is made based on the first and second diagnostic information.

According to another aspect of the invention, there is provided a method for determining a fault of an industrial control system, wherein the industrial control system comprises a first device connected with a field device via a first link and a second link in series and a second device connected with the field device via the second link and a third link in series, the first device is configured to be initially active in use, and the second device is configured to be initially passive in use, the method comprising steps of: obtaining from the first device first diagnostic information indicating, when the first device is active, whether there is a fault in the first link and/or the second link; when the first diagnostic information indicating that there is a fault in the first link and/or the second link, switching the first device into passive and switching the second device into active; obtaining from the second device second diagnostic information indicating, when the second device is active, whether there is a fault in the second link and/or the third link; when the second diagnostic information indicates that there is no fault in the second link and the third link, determining that there is a fault in the first link; and when the second diagnostic information indicates that there is a fault in the second link and/or the third link, regarding that there is a fault in the second link.

According to another aspect of the invention, there is provided an industrial control system for determining a fault therein, wherein the industrial control system comprises at least one of the above redundant device units.

According to another aspect of the invention, there is provided an industry system for determining a fault therein, which comprises the above industrial control system.

As compared with the prior art, the redundant device unit, the industrial control system and the industry system according to the present disclosure can determine whether the fault is from the link shared by both devices of the redundant device unit or from the unshared link of the active device, and thus improve the efficiency of fixing the fault, eliminate a risk of losing field control if the detected fault is from the unshared link of the active device and prohibit the endless switchover between the two devices of the redundant device unit.

These and further aspects and features of the invention will become more apparent from the following description and the drawings. In the description and the drawings, specific embodiments of the invention have been disclosed in details, and numerous ways in which the principle of the invention can be employed have been indicated. It shall be appreciated that the scope of the invention will not be limited thereto. The invention is intended to encompass numerous variations, modifications and equivalents without departing from the spirit and the scope of the appended claims.

It shall be emphasized that the term "include/comprise" as used in this context refers to presence of a feature, an integer, a step or a component but will not preclude presence or addition of one or more other features, integers, steps or components.

Numerous aspects of the invention will be better understood with reference to the drawings. Components in the drawings are not drawn in scale but merely intended to illustrate the principle of the invention. In order to facilitate illustration and description of some parts of the invention, corresponding parts in the drawings may be magnified, that is, they are made larger than other components in an illustrative apparatus manufactured in practice according to the invention. An element and a feature described in a drawing or an embodiment of the invention can be combined with an element and a feature illustrated in one or more other drawings or embodiments. Furthermore similar reference numerals in the drawings represent corresponding components in several drawings and can indicate corresponding components used in more than one embodiment.

BRIEF DESCRIPTION OF THE DRAWINGS referred embodiments of the invention have been illustrated in the drawings which constitute a part of the specification and serve to further elucidate together with the description the principle of the invention in details and in which.

DETAILED DESCRIPTION OF THE INVENTION

The invention will be described below in details with reference to the drawings, and it shall be noted that embodiments described later are merely intended to facilitate understanding of the invention but not to limit the invention in any way.

Figure 1:
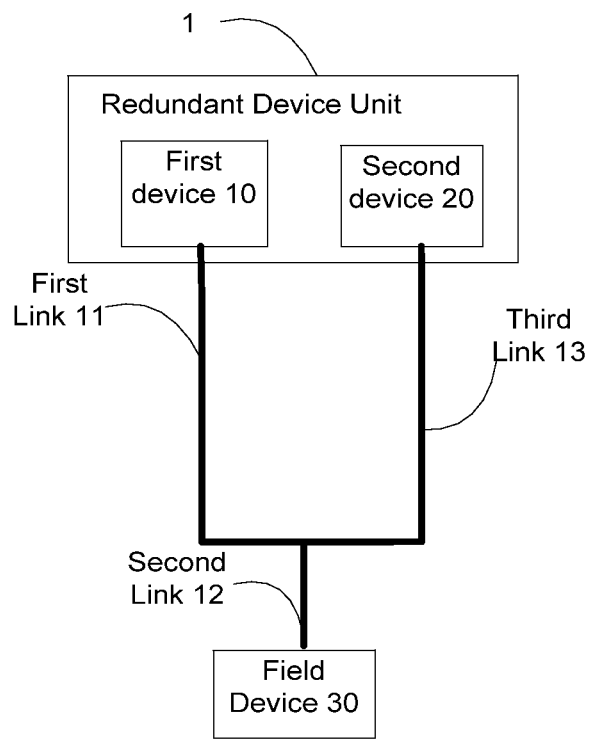
FIG. 1 is a schematic diagram showing a redundant device unit according to an embodiment of the present disclosure.

FIG. 1 is a schematic diagram showing the redundant device unit according to an embodiment of the present disclosure.

As shown in FIG. 1, the redundant device unit 1 for determining a fault in an industrial control system comprises a first device 10 configured to be connected with a field device 30 via a first link 11 and a second link 12 in series, and a second device 20 configured to be connected with the field device 30 via the second link 12 and a third link 13 in series. The first device 10 is configured to be initially active in use and send first diagnostic information indicating, when the first device 10 is active, whether there is a fault in the first link 11 and/or the second link 12; and the second device 20 is configured to be initially passive in use and receive the first diagnostic information from the first device 10. When the first diagnostic information indicates that there is a fault in the first link 11 and/or the second link 12, the first device 11 is switched into passive, and the second device 12 is switched into active and generates second diagnostic information indicating, when the second device 11 is active, whether there is a fault in the second link 12 and/or the third link 13, and a determination regarding the fault of the industrial control system is made based on the first and second diagnostic information.

As shown in FIG. 1, the second link 12 is shared by both the first device 10 and the second device 20 of the redundant device unit 1 for data transmitting with the field device 30.

Normally, the initially active device is the device initially used for data transmission with the field device, and the initially passive device is the device initially used as a redundant device of the initially active device, which may take over the operation of the active device when there is a fault in the link(s) connected between the active device and the field device. According to an embodiment, the first device 10 is configured to be initially active in use and the second device 20 is configured to be initially passive in use.

According to an embodiment of the present disclosure, the first device 10 is configured to send the first diagnostic information, and the second device 20 is configured to receive the first diagnostic information from the first device 10. Since only the active device is defined as communicating with the field device, the fault of the links connected between the device and the field device can be only detected in active device. That is to say, the first diagnostic information can be obtained only when the first device 10 is active.

Referring to FIG. 1, according to the embodiment of the present disclosure, when the first diagnostic information indicates that there is a fault in the first link 11 and/or the second link 12, a switchover is performed between the first device 10 and the second device 20, that is, the first device 10 is switched into passive, and the second device 12 is switched into active. According to one embodiment of the present disclosure, the switches may be initiated by the first device 10 when it detects a fault. However, the present disclosure is not limited thereto, and those skilled in the art may appreciate that other devices, such as a computer connected to the first device 10, can also initiate the switches of the first device 10 and the second device 20, as long as it could obtain the first diagnostic information from the first device 10.

Since the second device 12 becomes active, it is able to determining whether there is a fault in the links connected between the second device 20 and the field device 30, i.e. whether there is a fault in the second link 12 and/or the third link 13, and a second diagnostic information, indicating whether there is a fault in the second link 12 and/or the third link 13 when the second device 20 is active, can be generated by the second device 20 based on the determination. To be specific, if the second device 20 works normally after it is switched into passive, second diagnostic information indicating that there is no fault in the second link 12 and the third link 13 is generated; otherwise, a second diagnostic information indicating that there is a fault in the second link 12 and/or the third link 13 is generated. According to one embodiment of the present disclosure, both the received first diagnostic information and the generated second diagnostic information can be stored in a memory of the second device 20.

When the second device 20 obtains the first diagnostic information from the first device 10 and the second diagnostic information is generated by itself, it may make a determination regarding the fault in the industrial control system based on the first diagnostic information and the second diagnostic information.

Specifically, if the second diagnostic information indicates that there is no fault in the second link 12 and the third link 13, the second device 20 may make a determination that there is a fault in the first link 11, based on the first diagnostic information indicating that there is a fault in the first link 11 and/or the second link 12 and the second diagnostic information indicating that there is no fault in the second link 12 and/or the third link 13.

If the second diagnostic information indicates that there is a fault in the second link 12 and/or the third link 13, the second device 20 may determine that there is a fault in the second link 12, based on the first diagnostic information indicating that there is a fault in the first link 11 and/or the second link 12 and the second diagnostic information indicating that there is a fault in the second link 12 and/or the third link 13. It needs to be explained that although, theoretically, there are several possibilities regarding whether the fault is in first link 11 and/or second link 12 and/or third link 13, it is regarded as that the fault is in the second link 12 based on the fact that the possibility of both the first link and the second link having a fault is rather low.

Although the second device 20 is described as a device making determination regarding the detected fault, the present disclosure is not limited thereto. Those skilled in the art would appreciate that the determination may also be made by, for example, a computer connected with the first device 10 and the device 20, as long as it could obtain the first diagnostic information and the second diagnostic information from the first device 10 and the second device 20 respectively or collectively.

According to a preferred embodiment of the present disclosure, to facilitate the determination of fault based on the first diagnostic information and the second diagnostic information, the first diagnostic information sent by the first device 10 further comprises information indicating whether the first device is an active device or a passive device. Similarly, the second diagnostic information generated by the second device further comprises information indicating whether the second device 20 is an active device or a passive device.

The following table 1 illustrates the data format of the first and second diagnostic information according to a preferred embodiment of the present disclosure. As shown in table 1, the diagnostic information is stored in a 4-bit register, wherein the bits of D1-D0 are used for indicating the operation state of the device, that is, whether there is a fault in the links connected between the device and the field device and/or whether there is a fault in the device itself, the bit of D2 is used for indicating whether the device is an active device or a passive device, and the bit of D3 is a reserved bit.

TABLE 1

| D3 | D2 | D1 | D0 |
|---|---|---|---|
| Reserved | Redundant State of the device | Operation State of the device | |

According to an embodiment of the present disclosure, "0" in the bit D2 may indicate that the device is an active device, "1" in the bit D2 may indicate that the device is a passive device, "00" in bits D1-D0 may indicate that there is no fault in the device or the link connected between the device and its field device, "01" in bits D1-D0 may indicate that there is a fault in the device itself; "10" in bits D1-D0 may indicate that there is a fault in the links connected between the device and the field device and the fault is a fault of short circuit; "11" in bits D1-D0 may indicate that there is a fault in the links connected between the device and the field device and the fault is a fault of link break. Thus, if the bits D2-D0 representing the first diagnostic information show "010", it indicates that the first device is an active device and there is a fault of short circuit in the first link and/or the second link. The above configuration of the diagnostic information is exemplary only, and those skilled in the art would appreciate that other configuration may also be used for the diagnostic information.

According to the above embodiment, the determination regarding the fault of the industrial control system can be made easier based on the first and second diagnostic information with the above configuration.

According to a preferred embodiment of the present disclosure, the first device 10 is further configured to determine whether the second device 20 is ready to take over the operation of the first device 10 before the first device 10 is switched into passive and the second device 20 is switched into active. According to an embodiment of the present disclosure, the second device 20 is determined as not ready to take over the operation of first device 10 if the second device 20 detects a fault on its own, the second link and/or the third link; otherwise, the second device 20 is determined as ready to take over the operation of the first device 10. According to another embodiment of the present disclosure, the determination of whether the second device 20 is ready to take over the operation of the first device 10 can also be made based on the second diagnostic information of the second device 20 obtained when it was active at previous time. The second diagnostic information of the second device 20 may be updated similarly as the updated first diagnostic information which will be described hereinafter.

For example, when the diagnostic information is represented by D2-D0 bits as described in the above example, if the diagnostic information of the second device 20 is "100", it refers to that there is no fault in the second device 20 itself or the links connected between the second device 20 and the field device 30, and the second device 20 is ready to take over the operation of the first device 10; if the diagnostic information of the second device 20 is "101", it refers to that there is a fault in the second device 20 itself, and the second device 20 is not ready to take over the operation of the first device 10; and if the diagnostic information of the second device 20 is "110" or "111", it refers to that there is a fault in the second link 12 and/or third link 13, and the second device 20 is not ready to take over the operation of the first device 10 as well. Here although the second device 20 is in passive state, its operation state is obtained from its immediately previous active state and only the redundant state is updated when the second device 20 is switched into passive state.

If the second device 20 is determined as not ready to take over the operation of the first device 10, the switches of the first device 10 and 20 will not be performed.

If the second device 20 is determined as ready to take over the operation of the first device 10, the switches of the first device 10 and the second device 20 will be performed and a determination of the fault of the industrial control system will be made based on first diagnostic information and the new second diagnostic information generated by the second device 20.

Although the first device 10 is described as a device determining whether the second device 20 is ready to take over the operation of the first device 10, the present disclosure is not limited thereto. Those skilled in the art would appreciate that the determination can be also made by, for example, a computer connected with and the second device 20, as long as it could obtain the diagnostic information of the second device 20.

Since a determination of whether the second device 20 is ready to take over the operation of the first device 10 is made, the unnecessary switches of the first device 10 and the second device 20 is avoid when the second device 20 is determined as not ready to take over the operation of the first device 10.

In actual operation, it is considered impossible for both the first link and the second link having a fault at the same time (although there is a theoretical possibility), therefore, if the first diagnostic information indicates that there is a fault in the first link and/or the second link, the first link will be regarded as not having a fault under the circumstance that there is a fault in the second link.

Thus, according to a preferred embodiment of the present disclosure, the second device 20 is further configured to send the second diagnostic information when the fault in the second link 12 is fixed, and the first device 10 is further configured to receive the second diagnostic information and update the first diagnostic information according to the received second diagnostic information.

By using the redundant device unit 1 with the above configuration, under the circumstance that a new diagnostic information indicating that there is no fault in the second link 12 and/or third link 13 is generated when the fault in the second link is fixed, the second device 20 sends the new diagnostic information indicating that there is no fault in the second link 12 and/or third link 13, and the first device 10 receives the new diagnostic information from the second device 20 and update its diagnostic information as comprising information indicating that there is no fault in the first link and/or second link based on the new diagnostic information received from the second device 20. Thus, the first device 10 is ready to take over the operation of the second device 20 if there is any fault in the second device 20 and/or the links connected between the second device 20 and the field device 30.

According to the above embodiment, the first device 10 may update the first diagnostic information based on the new diagnostic information received from the second device 20, which indicates that there is no fault in the second link 12 and/or the third link 13, so that the next switches when a new fault is detected in the second device 20 are facilitated as described above.

Figure 2:
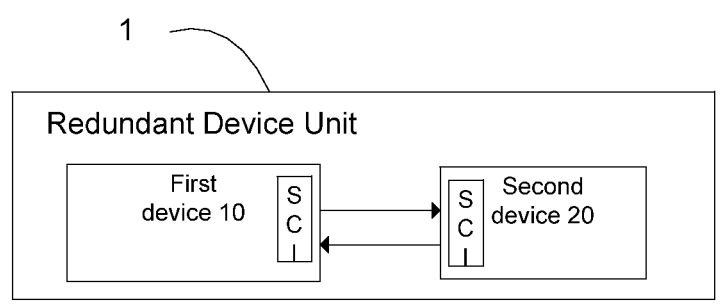
FIG. 2 shows a structure diagram of a specific implementation of the redundant device unit 1 as shown in FIG. 1.

FIG. 2 shows a structure diagram of a specific implementation of the redundant device unit 1 as shown in FIG. 1.

As shown in FIG. 2, according to an embodiment of the present disclosure, each one of the first device 10 and second device 20 of the redundant device unit 1 is provided with a serial communication interface (SCI), and the first device 10 sends the first diagnostic information through the serial communication interface of the first device 10 and the second device 20 receives the first diagnostic information through the serial communication interface of the second device 20.

It is only an example to configure the first device 10 and second device 20 of the redundant device unit 1 by providing serial communication interfaces, and the present disclosure is not limited thereto. The first devices 10 and the second device 20 may also send and receive diagnostic information through CAN bus, etc., as long as the second device 20 can receive the first diagnostic information from the first device 10.

According to an embodiment of the present disclosure, the first diagnostic information as well as the second diagnostic information may be sent both cyclic and event driven. For example, the first device 10 of the redundant device unit 1 may both send diagnostic information at predetermined period and send diagnostic information when any fault is detected.

According to a preferred embodiment of the present disclosure, the first and the second devices may be input/output modules.

According to a preferred embodiment of the present disclosure, the first link 11 and the third link 13 may be cables, such as data bus cable (DB cable), and the second link 12 may be cables, such as field cable. However, the present disclosure is not limited thereto, any one or two or all of the first link 11, second link 12 and the third link 13 may be, for example, wireless path. Correspondingly, the fault in the first link 11 may be a fault of the DB cable, and the fault in the second link 12 may be a fault of the field cable. According to another embodiment of the present disclosure, the fault in the first link 11 may be a fault of the DB cable and/or a fault of a field circuit.

In addition, another embodiment of the present disclosure also provides a method for determining a fault of the industrial control system, the industrial control system comprises a first device connected with a field device via a first link and a second link in series and a second device connected with the field device via the second link and a third link in series, the first device is configured to be initially active in use, and the second device is configured to be initially passive in use. An exemplar process of the method for determining a fault of the industrial control system is described with reference to FIG. 3.

Figure 3:
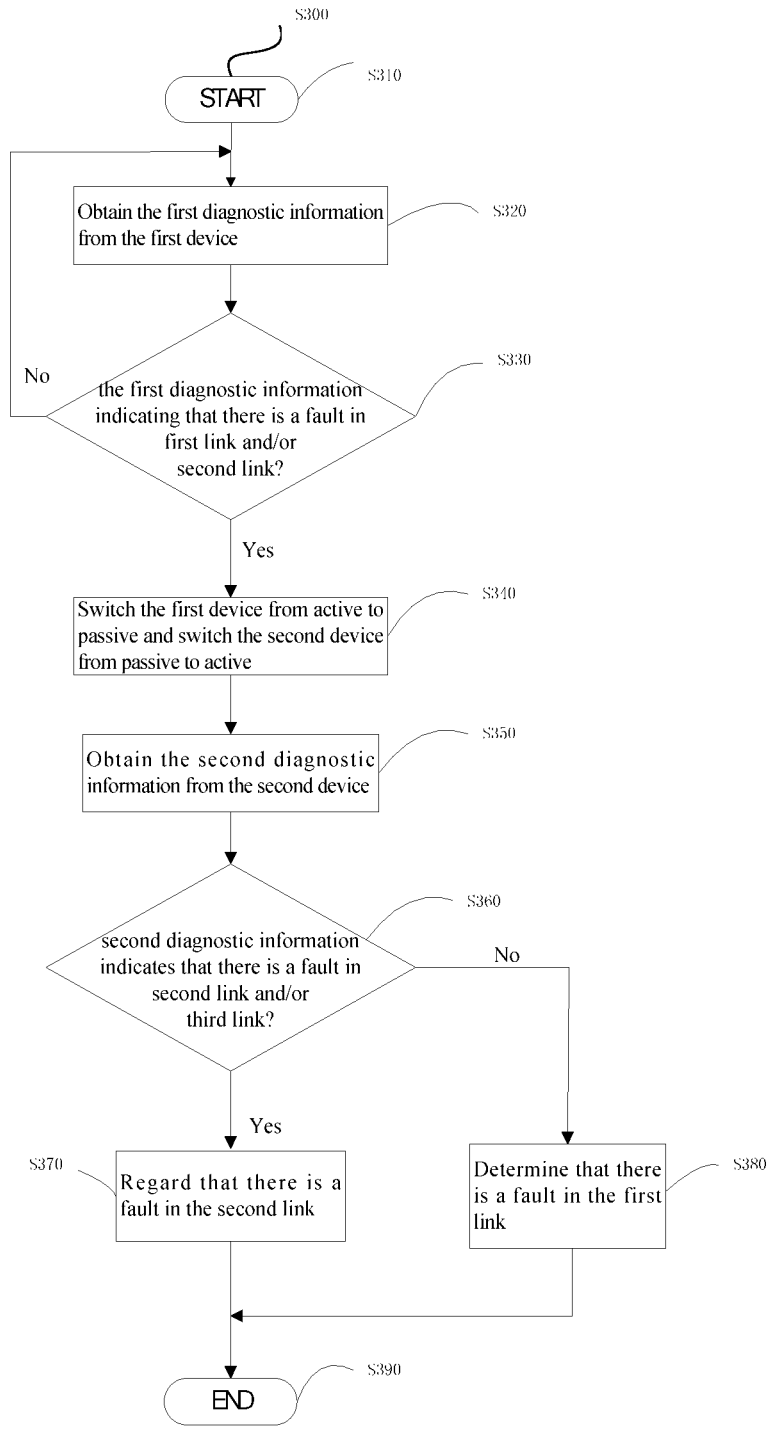
FIG. 3 is a flowchart of the process of the method for determining a fault of an industrial control system according to the embodiment of the present disclosure.

As shown in FIG. 3, the process of the method for determining a fault of the industrial control system according to the present disclosure starts at step S310, and then the step S320 is performed.

In step S320, first diagnostic information, indicating when the first device is active whether there is a fault in the first link and/or the second link, is obtained from the first device. The process of this step S320 may be performed by the second device 20 as described with reference to FIGS. 1-2. However, the present disclosure is not limited thereto, those skilled in the art would appreciate that the it could also be performed by other devices, such as, a computer connected with the first device 10 and the device 20. Then, the process goes to step S330.

In the step S330, a judgment is made as to whether the first diagnostic information indicates that there is a fault in the first link and/or second link. The process of this step S330 may be performed by, for example, the first device 10 as described with reference to FIGS. 1-2. If it is judged that the first diagnostic information indicates that there is a fault in the first link and/or the second link, the process goes to step S340, otherwise, the process goes back to step S320.

In the step S340, when it is judged that the first diagnostic information indicates that there is a fault in the first link and/or the second link ("Yes" in step S330), the first device is switched from active to passive and the second device is switched from passive to active. The process of this step S340 may be performed by the first device 10 as described with reference to FIGS. 1-2. However, the present disclosure is not limited thereto, those skilled in the art would appreciate that the it could also be performed by other devices, such as, a computer connected with the first device and the device. Then, the process goes to step S350.

Since in the step S340, the second device is switched into active, it is possible to obtain second information indicating whether there is a fault in the second link and/or the third link. Thus, in the step S350, the second diagnostic information is obtained from the second device. The process of this step S350 may be performed by the second device 20 as described with reference to FIGS. 1-2. However, the present disclosure is not limited thereto, those skilled in the art would appreciate that the it could also be performed by other devices, such as, a computer connected with the first device and the device. Then, the process goes to step S360.

In the step S360, a judgment is made as to whether the second diagnostic information indicates that there is a fault in the second link and/or the third link. If the second diagnostic information indicates that there is a fault in the second link and/or the third link, the process goes to step S370, otherwise, the process goes to step S380.

In the step S370, when the second diagnostic information is judged as indicating that there is a fault in the second link and/or the third link, it is regarded that there is a fault in the second link. The process of this step S370 may be performed by, for example, the second device 20 as described with reference to FIGS. 1-2. However, the present disclosure is not limited thereto, those skilled in the art would appreciate that it could also be performed by other devices, such as, a computer connected with the first device 10 and the device 20. Then, the process goes to step S390.

In the step S380, when the second diagnostic information is judged as indicating that there is no fault in the second link and/or the third link, it is determined that there is a fault in the first link. The process of this step S370 may be performed by, for example, the second device 20 as described with reference to FIGS. 1-2. However, the present disclosure is not limited thereto, those skilled in the art would appreciate that it could also be performed by other devices, such as, a computer connected with the first device 10 and the device 20. Then, the process goes to step S390.

The process of the method according to the embodiment of the present disclosure is ended at step 390.

According to a preferred embodiment of the present disclosure, the method further comprises: judging whether the second device is ready to take over the operation of the first device before switching the first device into passive and switching the second device into active; and if the second device is judged as ready to take over the operation of the first device, switching the first device into passive and switching the second device into active.

In addition, the embodiment of the disclosure further provides an industrial control system for determining a fault therein, and the industrial control system comprises at least one redundant device unit as described with reference to FIGS. 1-2.

An embodiment of the disclosure further provides an industry system for determining a fault therein, and the industry system comprises an industrial control system as described above and the field device as described with reference to FIG. 1.

As compared with the prior art, the redundant device unit according to the embodiments of the present disclosure and the industrial control system comprising the redundant device unit have at least one or more of the following advantages:

First, when a fault is detected, the first device is switched from active to passive and the second device is switched from passive to active, thus as compared with the prior art which does not perform the switchover, the field control will not lose if the fault is from the first link of the first device.

Second, since the second device can receive first diagnostic information from the first device, it is possible to determine whether the fault is from the links shared by the redundant pair of devices or is from the unshared link, thus it is easy to fix the fault according to where the fault is from. And also, in the present disclosure, the switchover will not continue if the fault is from the shared link of the two devices so that endless switchover is avoided.

The preferred embodiments of the present disclosure have been described in detail with reference to the appended drawings. However, a technical range of the present disclosure is not limited to the above examples. It will be apparent to those skilled in the art that various modifications and changes can be made without departing from the technical scope and spirit defined by the appended claims. Therefore, it should be understood that the various modifications and changes are included in the technical range of the present disclosure.

In the present disclosure, the steps that are described in the flowcharts and the sequence diagrams include the processing that is executed in time series according to the order described in the present disclosure and the processing that is not executed in the time series but executed in parallel or individually. In the steps that are executed in the time series, the order may be appropriately changed as necessary.

The invention claimed is:

1. A redundant device unit for determining a fault of an industrial control system, comprises:
   a first device configured to be connected with a field device via a first link and a second link in series, the first device being configured to be initially active in use and send first diagnostic information indicating when the first device is active, whether there is a fault in the first link and/or the second link; and
   a second device configured to be connected with the field device via the second link and a third link in series, the second device being configured to be initially passive in use and receive the first diagnostic information from the first device wherein the first diagnostic information is routed through the first link and the third link;
   wherein, when the first diagnostic information indicates that there is a fault in the first link and/or the second link, the first device is switched into passive and the second device is switched into active and generates second diagnostic information indicating, when the second device is active, whether there is a fault in the second link and/or the third link, and a determination regarding the fault of the industrial control system is made based on the first and second diagnostic information.

2. The redundant device unit according to claim 1, wherein when the second diagnostic information indicates that there is a fault in the second link and/or the third link, it is regarded as there is a fault in the second link.

3. The redundant device unit according to claim 1, wherein when the second diagnostic information indicates that there is no fault in the second link and the third link it is determined that there is a fault in the first link.

4. The redundant device unit according to claim 1, wherein the second device is further configured to send the second diagnostic information when the fault in the second link is fixed, and the first device is further configured to receive the second diagnostic information and update the first diagnostic information according to the received second diagnostic information.

5. The redundant device according to claim 3, wherein the first diagnostic information further comprises information indicating whether the first device is active or passive, and the second diagnostic information further comprises information indicating whether the second device is active or passive.

6. The redundant device unit according to claim 5, wherein the first device is further configured to determine whether the second device is ready to take over the operation of the first device before the first device is switched into passive and the second device is switched into passive, and the first device is switched into passive and the second device is switched into passive if the second device is determined as ready to take over the operation of the first device.

7. The redundant device unit according to claim 1, wherein each of the first device and the second device is provided with a serial communication interface, and the first device sends the first diagnostic information through the serial communication interface of the first device and the second device receives the first diagnostic information through the serial communication interface of the second device.

8. The redundant device unit according to claim 7, wherein the fault in the first link comprises a fault in a field circuit and/or a fault in a data bus cable, and the fault in the second link comprises a fault of the field cable.

9. The redundant device unit according to claim 8, wherein one or more of the first link, second link and the third link are cables.

10. The redundant device unit according to claim 9, wherein the first device and the second device are input/output modules.

11. A method for determining a fault of an industrial control system, wherein the industrial control system comprises a first device connected with a field device via a first link and a second link in series and a second device connected with the field device via the second link and a third link in series, the first device is configured to be initially active in use, and the second device is configured to be initially passive in use, the method comprising steps of:
the second device obtaining from the first device first diagnostic information indicating, when the first device is active, whether there is a fault in the first link and/or the second link;
when the first diagnostic information indicating that there is a fault in the first link and/or the second link, switching the first device into passive and switching the second device into active;
obtaining from the second device second diagnostic information indicating, when the second device is active, whether there is a fault in the second link and/or the third link;
when the second diagnostic information indicates that there is no fault in the second link and/or the third link, determining that there is a fault in the first link; and
when the second diagnostic information indicates that there is a fault in the second link and/or the third link, determining that there is a fault in the second link.

12. The method according to claim 11, wherein the method further comprises:
determining whether the second device is ready to take over the operation of the first device before switching the first device into passive and switching the second device into active; and
if the second device is determined as ready to take over the operation of the first device, switching the first device into passive and switching the second device into active.

13. An industrial control system for determining a fault therein, wherein the Industrial control system comprises at least one redundant device unit according to claim 1.

14. The industrial control system according to claim 13, wherein, the industrial control system is a process control system, the first device and the second device are used for collecting data from the field device or controlling the field device.

15. An industry system for determining a fault therein, comprising an industrial Control system according to claim 13 and the field device.

16. The redundant device unit according to claim 2, wherein when the second diagnostic information indicates that there is no fault in the second link and the third link, it is determined that there is a fault in the first link.

17. The redundant device unit according to claim 2, wherein the second device is further configured to send the second diagnostic information when the fault in the second link is fixed, and the first device is further configured to receive the second diagnostic information and update the first diagnostic information according to the received second diagnostic information.

18. The redundant device unit according to claim 4, wherein the first diagnostic information further comprises information indicating whether the first device is active or passive, and the second diagnostic information further comprises information indicating whether the second device is active or passive.

19. The redundant device unit according to claim 6, wherein each of the first device and the second device is provided with a serial communication interface, and the first device sends the first diagnostic information through the serial communication interface of the first device and the second device receives the first diagnostic information through the serial communication interface of the second device.

20. A method for determining a fault of an industrial control system, the method comprising steps of:
a second device obtaining from a first device, when active, first diagnostic information indicating whether there is a fault in a first link and/or a second link;
when the first diagnostic information indicates that there is a fault in the first link and/or the second link, switching the first device into passive and switching the second device into active;
obtaining from the second device, when active, second diagnostic information indicating whether there is a fault in the second link and/or a third link;
when the second diagnostic information indicates that there is no fault in the second link and/or the third link, determining that there is a fault in the first link;
when the second diagnostic information indicates that there is a fault in the second link and/or the third link, determining that there is a fault in the second link; and
wherein the industrial control system comprises the first device connected with a field device via the first link and the second link in series and the second device connected with the field device via the second link and the third link in series, the first device is configured to be initially active in use, and the second device is configured to be initially passive in use.

* * * * *